Oct. 19, 1937.  F. C. THOMAS  2,096,599
AIRCRAFT
Filed June 23, 1936   4 Sheets-Sheet 4

Fred C. Thomas, INVENTOR
BY
ATTORNEY

Patented Oct. 19, 1937

2,096,599

UNITED STATES PATENT OFFICE 2,096,599

AIRCRAFT

Fred C. Thomas, Cleveland, Ohio

Application June 23, 1936, Serial No. 86,789

3 Claims. (Cl. 244—17)

My invention relates to aircraft intended to comprise in common parlance, a combination automobile and airplane. In essential respects it is a land vehicle, capable of rising as an airplane, from or landing at low speeds on a very limited ground area.

More specifically, the invention comprises the combination of a closed cabin type of ship equipped with a unique form of helicopter airfoils or lifting wings, together with a propeller having a substantially horizontal axis which may move the vehicle forward in the air or on land.

Another object includes the arrangement of controls whereby the revolving lifting wings or airfoil elements may be driven separately or simultaneously with the horizontal axis of the propeller.

A more specific object includes the arrangement of a common power plant or motor with transmission devices capable of being readily controlled from the position accessible to the driver or pilot.

In carrying out my invention, I provide a vehicle body having somewhat streamline characteristics, long narrow lateral airfoils for wings, and supporting wheels capable of steering the vehicle while resting on the ground. I also provide ailerons corresponding to the ailerons of the usual airplane type and a rudder, the end of the ailerons being controlled by the operator, as will be hereinafter more fully described.

Another object is the special arrangement of the mounting of a plurality of superimposed helicopter wings or blades, preferably arranged vertically in pairs, resiliently connected with the body or fuselage, and capable of being driven or of being disconnected to remain idle while the rear propeller is being driven, as will more fully hereinafter appear.

In the drawings—

Figure 1:
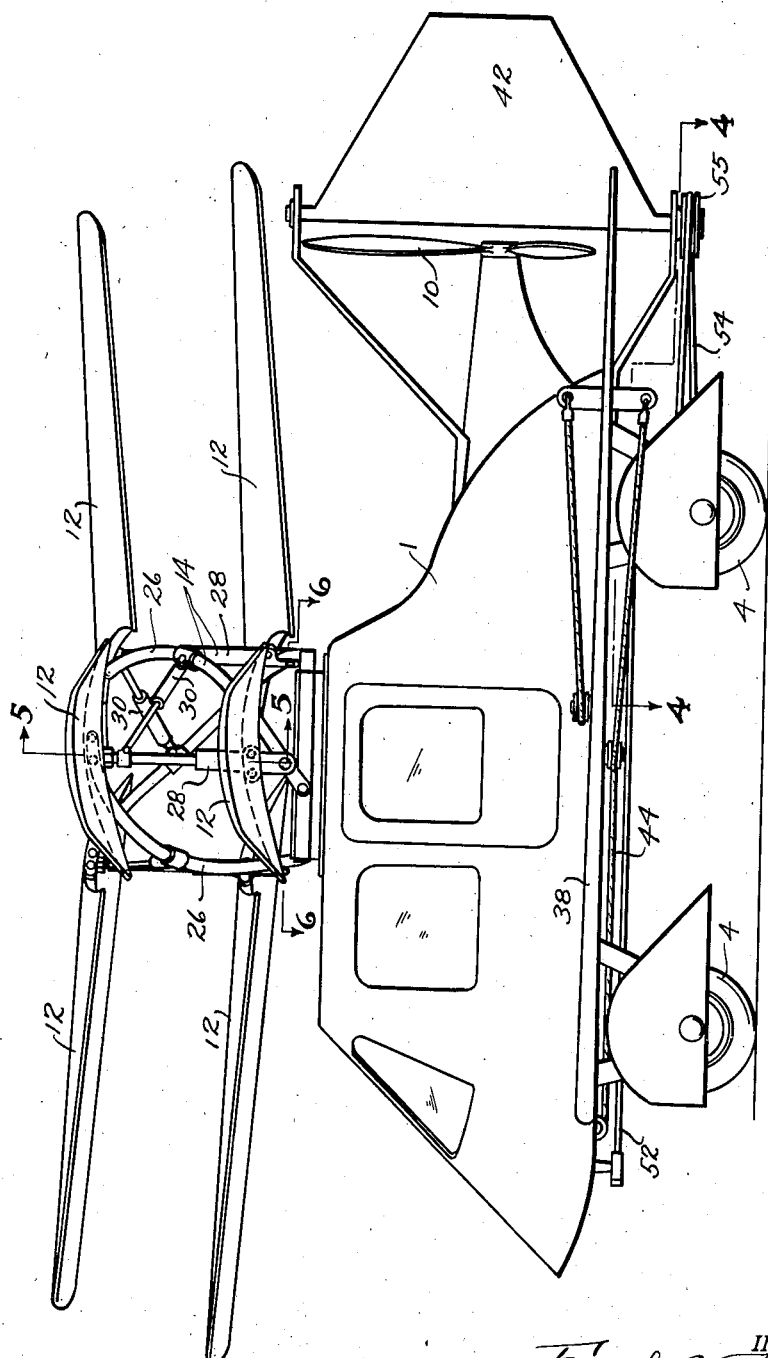
Fig. 1 is a side elevation of a flying machine embodying my invention.

Referring to the drawings, I have shown a cabin type of aircraft having a body or fuselage 1, which is provided with a bottom frame 2, and to which are secured supporting or landing wheels 4. Suitably secured to the frame is a motor 6 having a drive shaft 8 adapted to drive a rear horizontal propeller 10, which may move the vehicle forward in the air or on land, and a plurality of radially disposed lifting wings or airfoils 12 which are mounted on top of the body by means of a driving frame 14.

Figure 2:
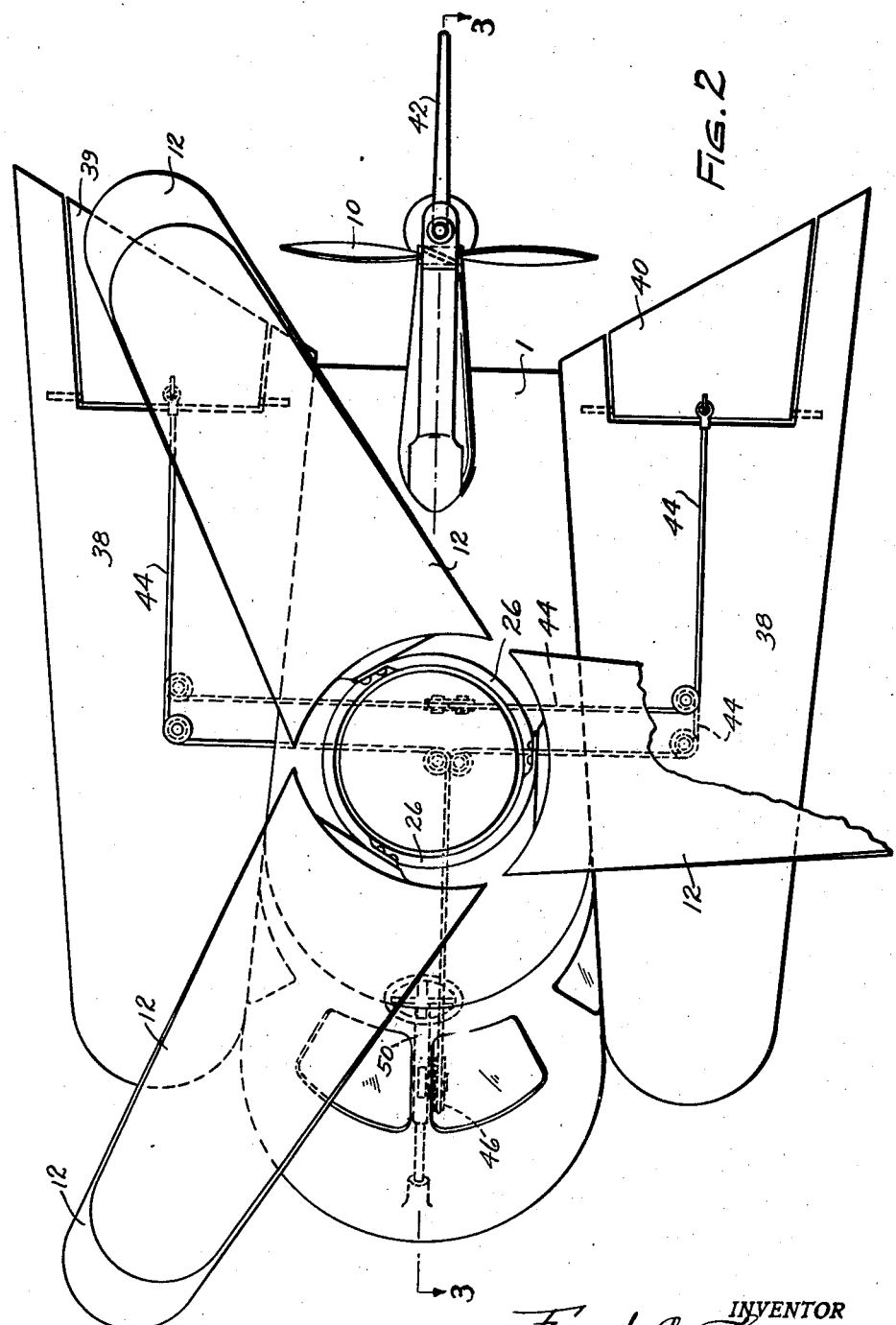
Fig. 2 is a top plan view of the machine shown in Fig. 1.
Figure 3:
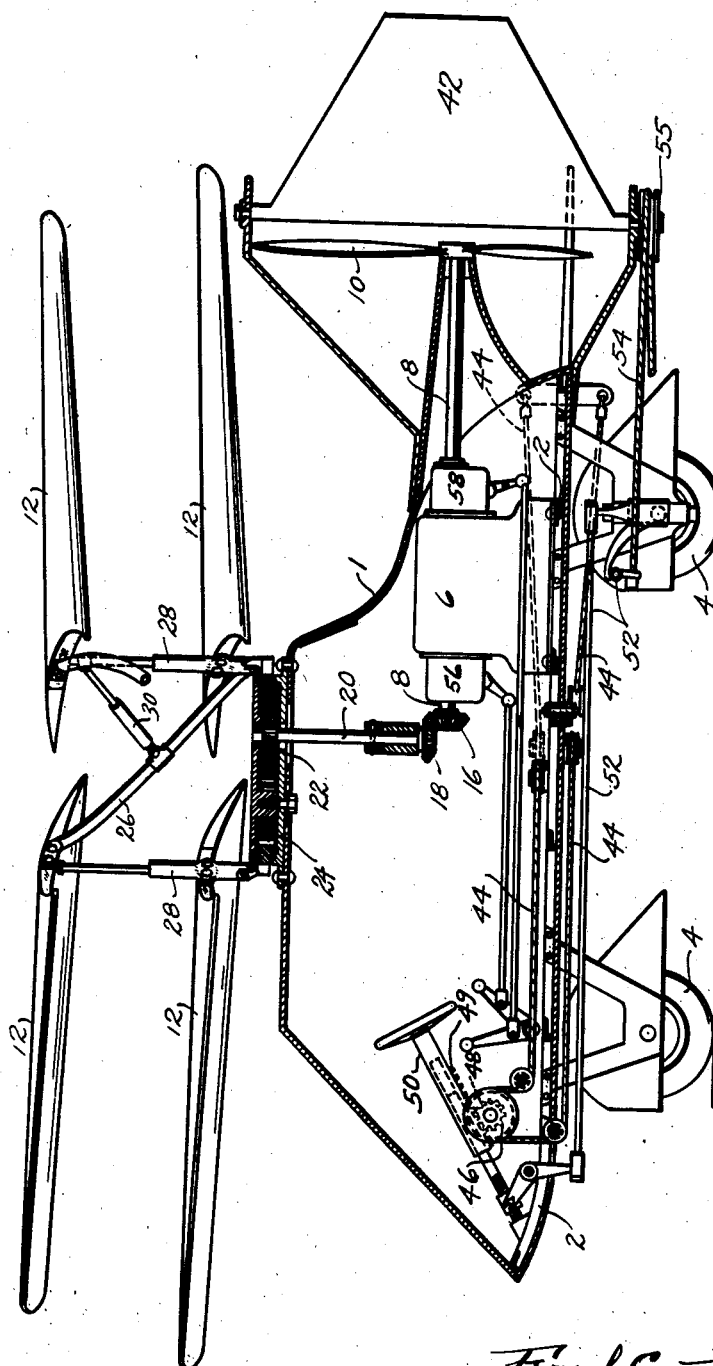
Fig. 3 is a vertical longitudinal cross section taken along the lines 3—3 of Fig. 2.

As illustrated in Figs. 1 and 2, the radial or lifting wings are arranged in a plurality of superimposed helicopter wings or blades and are preferably arranged vertically in pairs. A suitable manner of driving the radial wings or airfoils is illustrated in Fig. 3, and may include a bevel gear 16 mounted on the shaft 8 and being adapted to mesh with a complementary gear 18 on the shaft 20. Mounted on the shaft 20 is a spur gear 22 adapted to mesh with a ring gear 24 to which the driving frame 14 is secured. The driving frame 14 is provided with spiral supports 26, being spiraled in the direction of rotation, and vertical supports 28. Cross members 30 are provided to maintain an equal distance between the spiral supports at their upper ends.

Figures 5, 6:
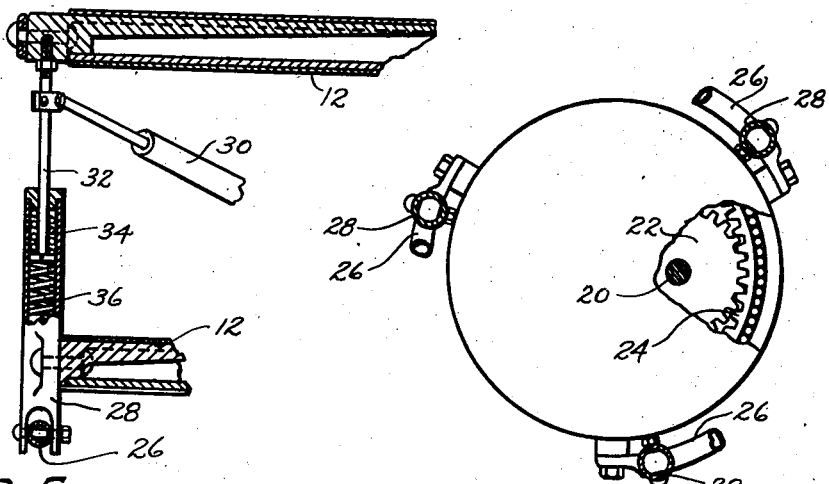
Fig. 5 is an enlarged sectional view taken on a plane indicated by the line 5—5 of Fig. 1.
Fig. 6 is a partial sectional view of the driving means for the airfoils or lifting wings taken on a plane indicated by the lines 6—6 of Fig. 1.

It is well known to the art that gyrating wings of the nature described are subjected to severe stresses and strains due to conflicting air currents. To compensate for these stresses and strains, I provide shock absorbing means enclosed in the vertical supporting members 28, consisting of a plunger 32 coacting with springs 34 and 36, as shown in Fig. 5. Similar shock absorbing means may be employed in the cross member 30.

To relieve the gyrating wings 12 of the entire weight of the machine while in flight, side wing members 38 extending longitudinally the full length of the fuselage and suitably secured thereto, are provided.

Pivotally secured to the side wing members 38 are elevating controllers 39 and 40 which together with a rudder member 42 control the directional flight of the vehicle. The elevating members 39 and 40 are controlled by a cable 44 extending around idler pulleys to a master pulley 46, the master pulley 46 being integral with a pinion 48 which is associated with a rack 49 on a telescoping steering column 50, as illustrated in Fig. 3.

For controlling the direction of horizontal travel of the vehicle upon landing or in the air, the rudder 42 is arranged to operate in conjunction with a usual steering arm and tie rod mechanism 52 commonly used on land motor vehicles.

Figure 4:
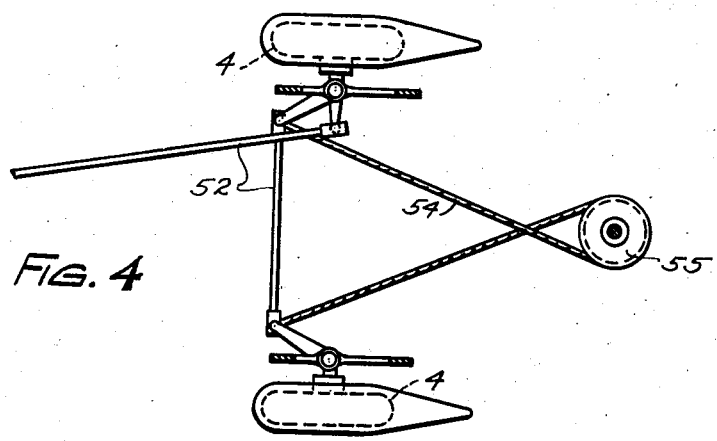
Fig. 4 is a vertical section of the steering mechanism taken substantially along the lines 4—4 of Fig. 1.

A cable 54 connects the tie rod 52 with the rudder member 42 by means of a rudder pulley 55, as shown in Fig. 4. It will be noted that the steering arm and tie rod mechanism 52 operate the rear wheels for steering the vehicle while on the ground.

To drive the gyrating wing members or airfoils 12 and the propeller 10 at any selective speed, gear transmissions 56 and 58, respectively, may be provided. Thus it will be noted that the airfoils or lifting wings may be driven separately or simultaneously with the horizontal axis of the propeller. In taking off, the propeller 10 is brought to the required starting speed and the driving connection such as described is formed between the motor and the gyrating wings 12. After the craft attains flying speed in flight the speed of the wings may be reduced or they may be disconnected from the motor, depending on conditions. However, upon landing, especially where it is sought to land on a very limited area of ground, the wings or airfoils 12 should be drivingly connected with the engine and gyrated at a high velocity, which in effect increases the supporting surface of the flying machine.

To increase the efficiency of the vehicle by reducing the air resistance, the body or fuselage may be streamlined and the wheels of the vehicle may be provided with the usual streamlined canopies.

While I have illustrated a special arrangement of mounting a plurality of broad superimposed radial wings or airfoils, preferably arranged vertically in pairs and capable of being driven or of being disconnected to remain idle while the rear propeller is being driven, it is to be understood that all such arrangements as may be made within the spirit and scope of the appended claims are also included.

I claim:

1. In a power driven aircraft of the character described, having a body, side wing members extending longitudinally the full length of said body, elevating members pivotally secured to the side wing members, a propeller and power means to operate said propeller, a plurality of superimposed radial lifting wings arranged vertically in pairs, and means for gyratably connecting said radial wings to said power means whereby said wings may be gyrated independently of the forward movement of the craft, which means includes a frame having vertical spiral and cross members to which said radial wings are attached, and shock absorber means interposed in said members for resisting without distorting the excessive stresses and strains caused by conflicting and extreme air currents.

2. In an aircraft of the character described, having a body, power means to support said aircraft in air, said means including a plurality of superimposed radial lifting wings arranged vertically in pairs, a driving frame having vertical, spiraled and cross member supports, shock absorbing means enclosed in the said vertical and cross member supports, said spiraled supports being spiral in the direction of rotation of said lifting wings, and disengageable means for drivingly connecting said wings with the engines of said aircraft.

3. In a helicopter, the combination with a propeller shaft, of a rotatable supporting frame drivingly connected to said shaft, said frame including resilient means for permitting relative movement of the supports with respect to each other, and radial lifting wings rigidly connected to said frame.

FRED C. THOMAS.